United States Patent [19]

Wanner

[11] 3,953,154
[45] Apr. 27, 1976

[54] PRESSURE CONTROL AND UNLOADER VALVE

[76] Inventor: William F. Wanner, 5805 View Lane, Minneapolis, Minn. 55436

[22] Filed: Nov. 15, 1973

[21] Appl. No.: 416,253

Related U.S. Application Data

[62] Division of Ser. No. 203,562, Dec. 1, 1971, Pat. No. 3,775,030.

[52] U.S. Cl. .................. 417/270; 137/116; 417/302; 137/116.3
[51] Int. Cl.² ............................. F04B 49/00
[58] Field of Search .............. 137/116, 116.3; 417/302, 307, 270

[56] References Cited
UNITED STATES PATENTS

| | | | |
|---|---|---|---|
| 1,557,426 | 10/1925 | Conrader | 417/302 |
| 1,780,782 | 11/1930 | Holmes | 137/116 |
| 2,122,045 | 6/1938 | Rose et al. | 417/307 |
| 2,173,819 | 9/1939 | Boldt | 417/302 |
| 2,313,351 | 3/1943 | Magnuson | 417/307 |
| 2,429,489 | 10/1947 | Roth | 137/116 |
| 2,545,712 | 6/1944 | Stevenson | 137/116 |
| 2,571,154 | 10/1951 | Mercier | 137/116 |
| 3,143,127 | 8/1964 | Frost | 137/116.3 |
| 3,481,359 | 12/1969 | Robnick | 137/116 |

FOREIGN PATENTS OR APPLICATIONS

| 868,601 | 8/1942 | France | 137/116 |
|---|---|---|---|

Primary Examiner—William L. Freeh
Attorney, Agent, or Firm—Dorsey, Windhorst, Hannaford, Whitney & Halladay

[57] ABSTRACT

An improved pressure control valve and unloader valve incorporating a floating check valve which is responsive to a gradual restriction in the discharge line and is also responsive to the shock wave formed as a result of a sudden shut-off of the discharge line; and the combination of such a pressure control valve with a high pressure diaphragm pump.

12 Claims, 9 Drawing Figures

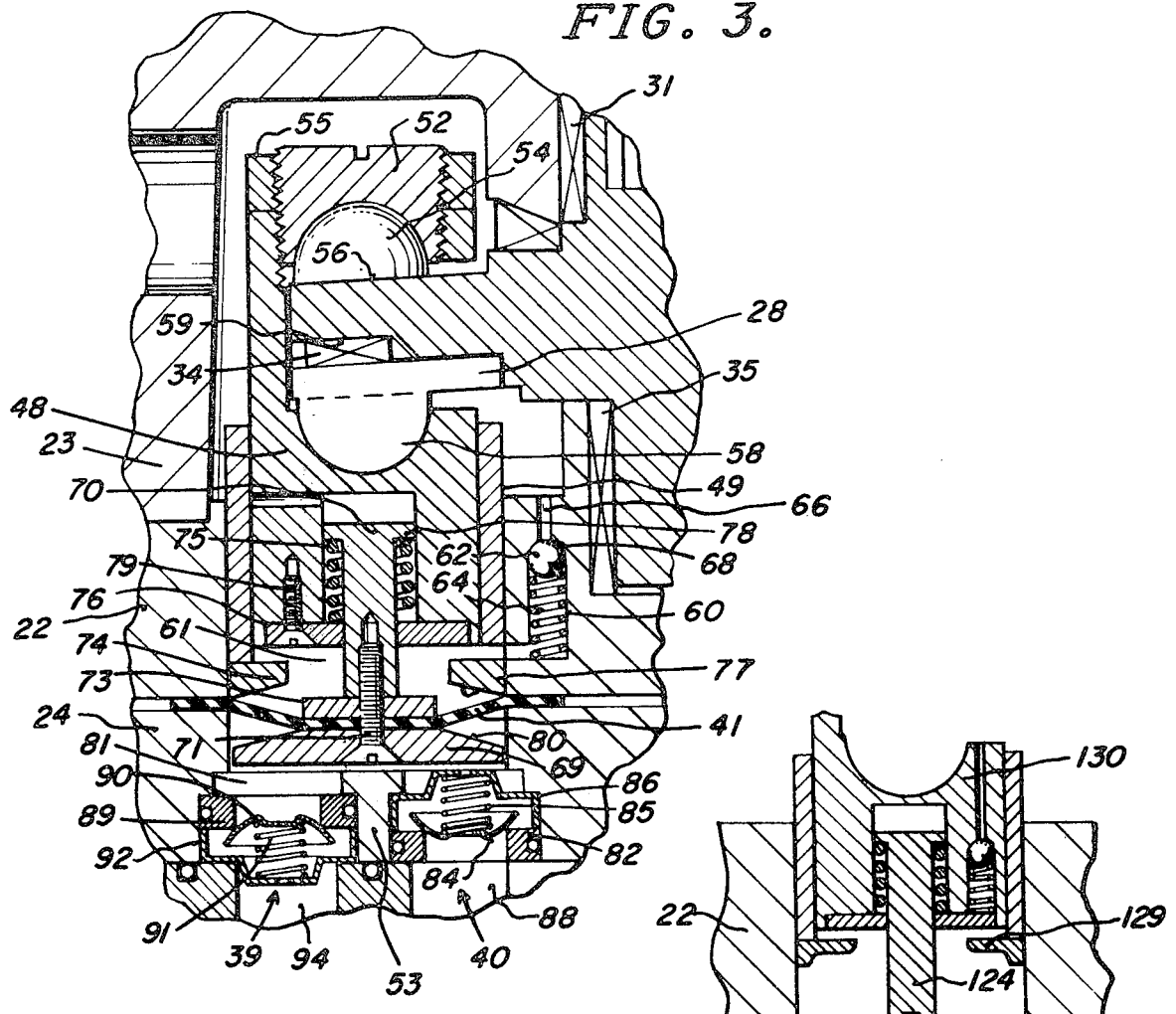
FIG. 3.
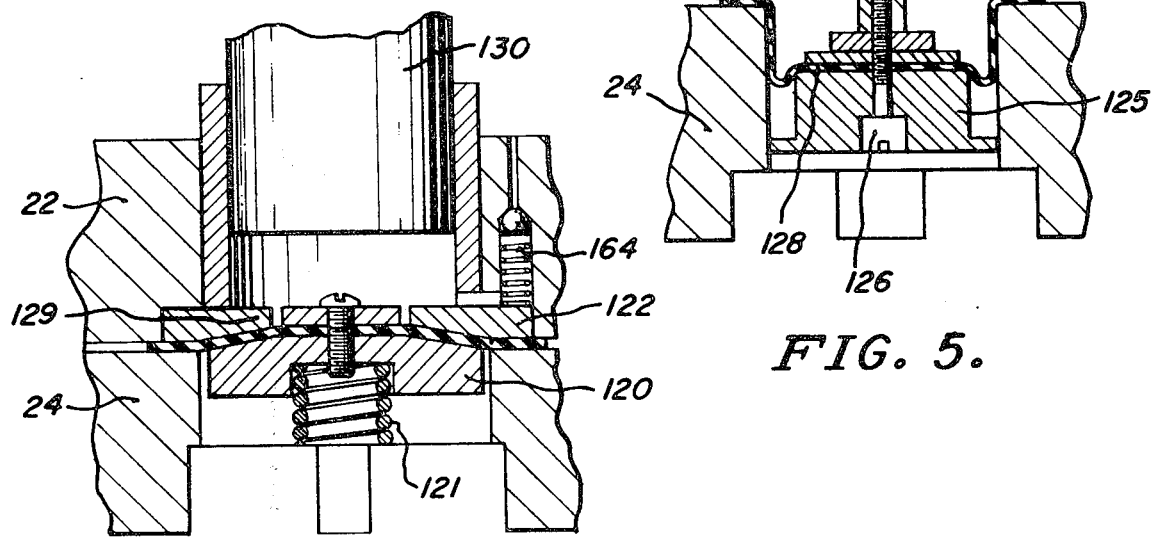
FIG. 4.
FIG. 5.

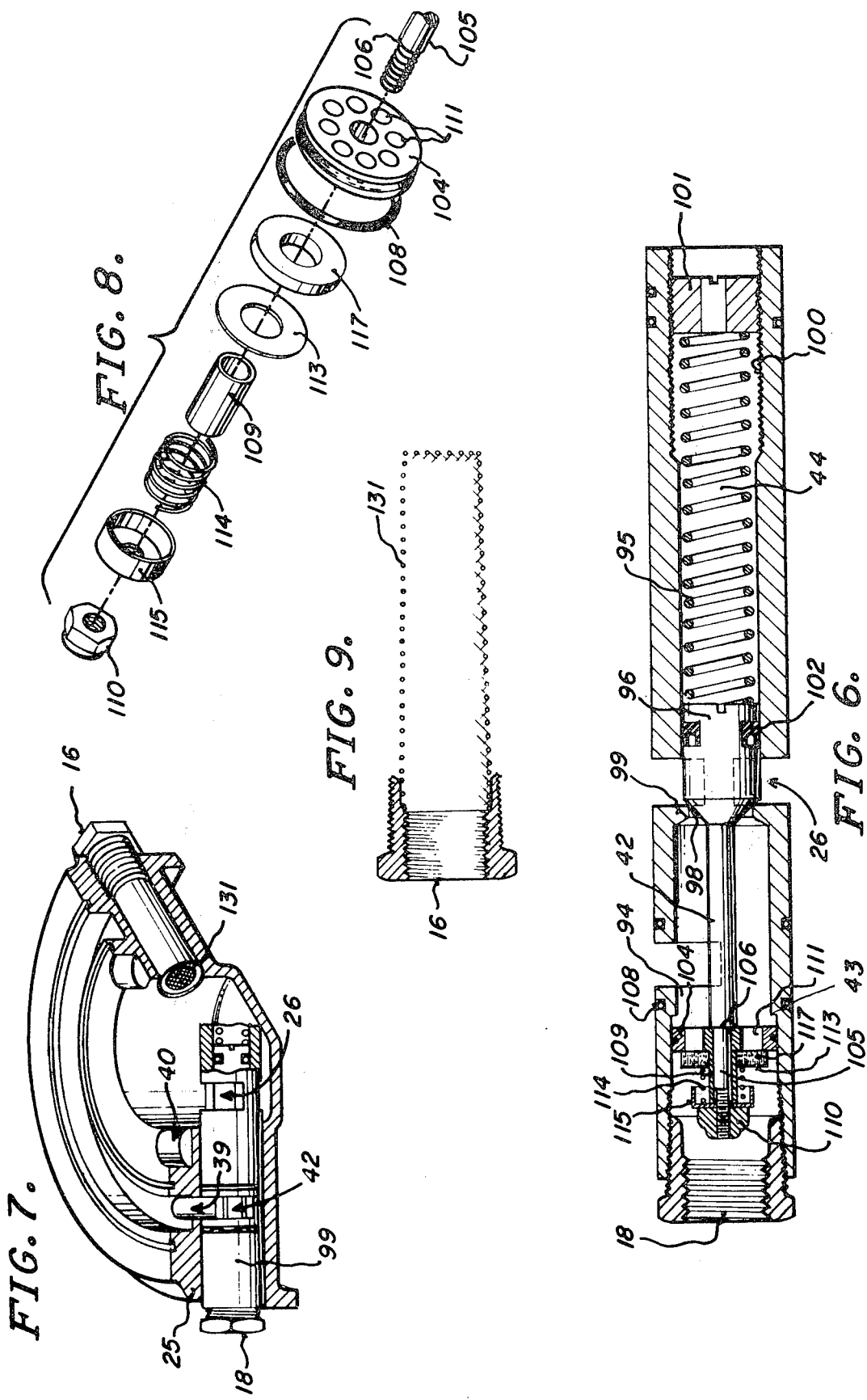

PRESSURE CONTROL AND UNLOADER VALVE

This application is a division of Ser. No. 203,562, filed Dec. 1, 1971, now U.S. Pat. No. 3,775,030, issued Nov. 27, 1973.

BACKGROUND AND SUMMARY OF THE INVENTION

The present invention relates generally to an improved pressure control and unloader valve and to the combination of such a valve with a high pressure diaphragm pump.

In contrast to the prior art, the present invention includes an improved pressure control and unloader valve usable for controlling the output pressure of a pump in the event that the discharge end of such pump is shut off or restricted. The improved unloader valve of the present invention includes means utilizing a water hammer and a floating check valve to open the unloader valve quickly as soon as the discharge end is shut off and to keep the unloader valve open for recirculation of the fluid being pumped until the discharge end is again opened. A present invention also includes the combination of such a pressure control valve with a diaphragm pump.

Accordingly, an object of the present invention is to provide an improved pressure control and unloader valve in which the unloader valve is controlled by the differential pressure between the pressure at the outlet of the pumping chamber of a pump with which such valve is used and atmospheric pressure.

A further object of the present invention is to provide an improved pressure control and unloader valve which utilizes a water hammer to open and keep open an elongated valve upon sudden shut off of the discharge end of the outlet passage.

Another object of the present invention is to provide a pressure control and unloader valve which includes a floating check valve.

A further object of the present invention is to provide an improved combination pressure control valve and diaphragm pump.

These and other objects of the present invention will become apparent upon reference to the drawings, the description of the preferred embodiment, and the appended claims.

DESCRIPTION OF THE DRAWINGS

FIG. 3 is a cross sectional view of the piston and diaphragm assemblies of the diaphragm pump of FIG. 2.

FIGS. 4 and 5 are cross sectional views of alternative embodiments of the diaphragm assembly.

FIG. 6 is a cross sectional view of the improved pressure control and unloader valve.

FIG. 7 is a perspective view partially in section, of the manifold casting of the improved diaphragm pump.

FIG. 8 is an exploded perspective view of the floating check valve.

FIG. 9 is a cross sectional view of the strainer which is designed to fit within the inlet to the pump.

DESCRIPTION OF THE PREFERRED EMBODIMENT

Figure 1:
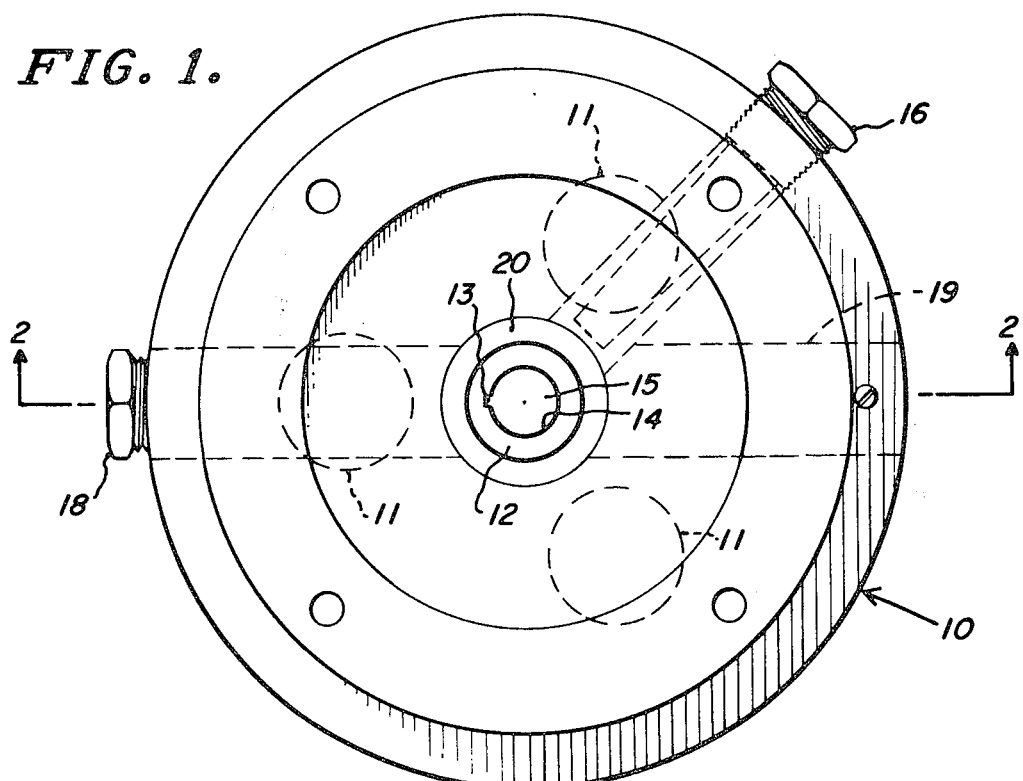
FIG. 1 is a plan view of a diaphragm pump with which the pressure control valve of the present invention may be used.

Referring first to FIG. 1, a high pressure, multi-piston, diaphragm pump 10 includes three piston assemblies, indicated by the broken lines 11, equally radially spaced from the center of the pump and each separated from each other by 120°. As will be explained more in detail with reference to the other FIGS., the piston assemblies 11 are caused to reciprocate by a cam plate which is rigidly secured to a cam shaft 12. The cam shaft 12 is located in the center of the pump 10 and extends axially therethrough. The cam shaft 12 includes a centrally located bore 14 for engagement with a drive shaft 15, and further includes a longnitudinal groove 16 adapted to receive a piece of conventional key stock thereby causing the cam shaft 12 and the drive shaft 15 to rotate together. The drive shaft 15 extends upwardly from the pump 10 and is driven by an electric motor (not shown). The preferred embodiment of the present invention is designed to be connected with a N.E.M.A. "C" flange motor.

Also shown with reference to FIG. 1 are the relative positions of the pumping fluid inlet 16, the pumping fluid discharge 18, and the biasing means chamber 19 of the unloader valve. During operation, the three piston assemblies 11 are sequentially reciprocated by the rotating cam plate resulting in a relatively constant output of fluid from the discharge 18.

Figure 2:
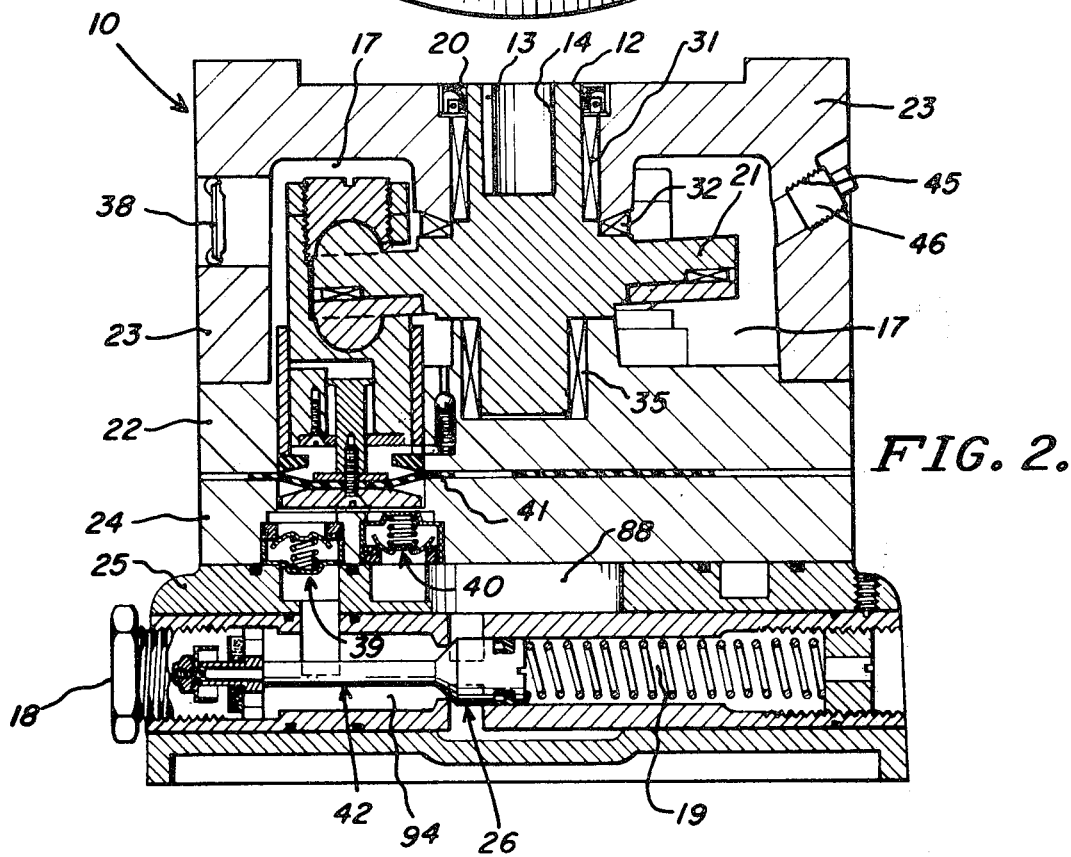
FIG. 2 is a cross sectional view of the diaphragm pump and pressure control valve of FIG. 1 as viewed along the line 2—2.

Reference is now made to FIG. 2 which is a cross sectional view of the pump shown in FIG. 1. The view in FIG. 2 is taken along the line 2—2 of FIG. 1. Generally, the upper portion of the pump 10 includes an aluminum casting 23 serving as part of the pump case and a cylinder sleeve holder casting 22 adapted to engage the aluminum casting 23 to form the cam shaft case 17. As will be more fully explained below, the cam shaft case 17 houses the cam assembly and the piston assembly and is designed to be filled with hydraulic fluid to a preselected level indicated on the sight glass 38. Connected below the cylinder sleeve holder casting 22 is a valve plate casting 24 adapted to house the discharge valve assembly 39 and the suction valve assembly 40. Disposed between the castings 22 and 24 in a sealed relationship is a diaphragm 41 associated with each of the piston assemblies. Adjacent to the valve plate casting 24 is the base or manifold casting 25. The manifold casting houses the intake 16 (FIG. 1), the unloader valve 26, including the spring chamber 19, and the pump discharge 18. The composition of the valve castings 24 and 25 depend upon the corrosiveness and abrasiveness of the material being pumped.

Referring more specifically now to the internal structure of the pump 10, each of the piston assemblies are reciprocated by a cam assembly which includes the cam shaft 12 rotatably mounted within the castings 22 and 23 and a cam plate 21 secured to the shaft 12, rotatably mounted within the castings 22 and 23 and adapted to engage an upper portion of each of the piston assemblies. As can be seen, the cam plate 21 is canted with respect to the cam shaft 12. Thus, as the cam shaft 12 and the cam plate 21 are rotated, the piston assemblies are caused to reciprocate as a result of engagement with the peripheral edge of the rotating plate 21.

The cam shaft 12 is journalled in the castings 22 and 23 by the lower needle roller bearing 35 and the upper needle roller bearing 31 respectively. A suitable packing or shaft seal 20 is disposed above the upper bearing 31 and between the outer surface of the shaft 12 and the castings 23 to seal the cam shaft case 17 and thus prevent hydraulic fluid in the case 17 from leaking between the shaft 12 and the casting 23. The shaft 12 includes an inner cylindrical bore 14 adapted to receive a drive shaft (not shown) which in turn is designed to connect with a suitable motor. A longitudinal key groove or channel 13 is cut into a portion of the shaft 12 to permit a piece of conventional key stock to be inserted therein to cause the drive shaft (not shown) and the cam shaft 12 and plate 21 to be rotated together.

The cam shaft 12 and the cam plate 21 are additionally supported by a tapered thrust bearing 32 disposed between an upper surface of the plate 21 and a portion of the casting 23. This bearing 32 counters the forces exerted by the plate 21 on the piston assemblies. The bearings 32, 31 and 35 and the entire cam assembly are lubricated by the hydraulic fluid in the cam shaft case 17. When the fluid in the case 17 needs to be replenished or changed, this is accomplished by draining the case 17 and refilling it through the threaded opening 45 which is normally closed by the plug 46.

Referring now to FIG. 3, each of the piston assemblies includes a piston 48 and a cylindrical piston sleeve 49 associated with a diaphragm assembly and a valve assembly. The cylindrical piston sleeve 49 is securely fitted within the cylinder sleeve holder casting 22 and is adapted to receive the piston 48. Threadedly received by the piston at its upper end is a tappet 52 designed to retain the upper bronze foot member 54 in proper association with the cam plate 21. A lock-nut 55 is threadedly advanced over the tappet 52 and jammed against the piston body 48 to prevent the tappet 52 from loosening as a result of the vibratory movements of the pump. The bronze foot 54 has a hemispherical shape and includes a flat surface 56 adapted to slideably engage the upper surface of the cam plate 21. The piston body 48 also houses a lower bronze foot 58, similarly hemispherically shaped, and adapted to engage the bottom surface of a pressure plate or ring 28. The plate 28 is designed to remain stationary during operation of the pump and to transfer the reciprocal movement of the cam plate 21 to the pistons 48. Disposed between the pressure plate 28 and a bottom annular surface 59 of the cam plate 21 is a needle thrust roller bearing 34.

Each of the foot members 54 and 58 are hemispherically shaped to accommodate the rotational movement of the canted cam plate 21 and the reciprocating movement of the piston 48. Consequently, each of the foot members 54 and 58 rotate reciprocally during the operation of the pump 10. The foot members 54 and 58 and the needle bearing 34 are lubricated by the hydraulic fluid in the cam shaft case 17.

As can be seen in FIG. 3, the piston 48 is designed to slide fairly tightly through the cylindrical piston sleeve 49. It should be noted, however, that although the fitting relationship between the piston 48 and the sleeve 49 is sufficiently tight so that reciprocating movement of the piston 48 causes the diaphragm 41 to also reciprocate, it is loose enough to allow some of the hydraulic fluid to leak between the exterior cylindrical surface of the piston 48 and the interior cylindrical surface of the sleeve 49 to lubricate the same.

Contained within the casting 22, is a check valve assembly or first valve means which includes a large passageway 60 extending from the transfer chamber 61, a steel ball or valve 62, a valve spring 64 biasing the ball 62 upwardly, and a smaller passageway 66 extending from one end of the passageway 60 to the cam shaft case 17. As a result of the force exerted by the valve spring 64, the steel ball 62 is continually biased against the shoulder portion 68 connecting the passageways 60 and 66 to control the passage of fluid from the case 17 into the transfer chamber 61 and to prevent the flow of hydraulic fluid from the transfer chamber 61 into the case 17. It should be noted that fluid will pass from the case 17 and into the transfer chamber 61 only if the pressure differential between the hydraulic fluid in the case 17 and the transfer chamber 61 is sufficiently large. This pressure differential is of course determined by the size of the valve spring 64 and the size of the passageway 66 against which the steel ball 62 is seated.

The diaphragm assembly includes a diaphragm 41 disposed in a sealed relationship between the castings 22 and 24, a follower plate 69 secured to the bottom or pumping chamber side of the diaphragm 41, and a plunger stem 70 secured to the upper or transfer chamber side of the diaphragm 41. The follower plate 69 and the plunger stem 70 are securely connected in this arrangement by a screw 71 extending through the plate 69 and a stem plate 73 disposed on either side of the diaphragm 41 and into the plunger stem 70. The diaphragm assembly further includes an annular stop member or shoulder portion 74 formed within the transfer chamber 61 and designed to engage a portion of the upper surface of the diaphragm 41 during its upward movement. The shoulder portion 74 includes a bottom canted surface 77 conforming substantially with the upper canted surface 80 of the follower plate 69 between which the diaphragm 41 is disposed. At one point during each upward movement of the piston 48, the canted surface 80 and the diaphragm 41 are caused to be seated against the canted surface 77 of the stop member 74. The stop member 74 is positioned so that the diaphragm 41 seats against the surface 77 just prior to the completion of the upward stroke of the piston 48. Because of the further upward movement of the piston 48 after seating of the diaphragm 41 against the surface 77, a suction is created in the transfer chamber 61 thereby causing hydraulic fluid to flow from the case 17, through the check valve assembly defined by the members 62 and 64 into the chamber 61 to replenish the hydraulic cell. The amount of fluid replenished conforms to the amount of fluid which leaked from the chamber 61 between the piston 48 and the cylinder 49 during the downward stroke of the piston 48.

The plunger stem 70 is continuously biased upwardly by a plunger spring or bias means 75 having one end disposed against the upper surface of a piston nose plate 76 and the other end disposed against the bottom annular surface of a plunger stem flange 78. The flange 78 is integrally formed with the stem 70 and extends outwardly therefrom. The nose plate 76 is securely connected with the bottom portion of the piston 48 by a plurality of screws 79. In the preferred embodiment, the spring 75 is a coil compression spring. Although the actual size of the spring 75 may vary, the force per unit area exerted by the spring 75 on the diaphragm plus the force per unit area required to open the ball check valve 62 must be greater than the force per unit area exerted on the diaphragm through atmospheric pressure. In the preferred embodiment, the spring 75 exerts a force which develops a pressure of 15–18 p.s.i. on the diaphragm 41 whereas the spring 64 exerts a force on the ball 62 such that a pressure of about 3 p.s.i. is required to move the ball off the seat. However, in accordance with the limitation discussed above, the force exerted by the spring 75 on the diaphragm 41 may be less than atmospheric pressure, providing, that force plus the force required to open the ball check valve 62 is greater than atmospheric pressure.

With further reference to FIG. 3, the valve plate casting 24 houses a pumping chamber 81 and a valve assembly. The valve assembly includes a suction valve 40 and a discharge valve 39. The suction valve 40 includes a valve seat 82, a valve plate 84, a spring member 85 and a retainer member 86. These elements are oriented to prevent the fluid in the pumping chamber 81 from passing through the suction valve 40 and into the suction chamber 88 but to permit fluid in the chamber 88 to flow through the valve 40 and into the chamber 81. This flow will only occur, however, if the pressure differential between the fluid in chamber 88 and the fluid in chamber 81 is sufficient to overcome the force of the spring 85. Of course, to maximize the efficiency of the pump, this pressure differential is intended to be as small as possible. Therefore, under ideal conditions, there is a continuous supply of fluid to the pumping chamber 81. The chamber 88 is designed to be in communication with a source of fluid to be pumped via the inlet 16. As illustrated in FIGS. 7 and 9, the inlet 16 is connected with a strainer for filtering impurities from the pumped fluid prior to introduction into the pump. The strainer 131 includes a screen which in the preferred embodiment is 100 mesh.

The valve plate 84 is positioned immediately above the valve seat 82 and engages the seat 82 to prevent fluid from passing between the plate 84 and the seat 82. The plate 84 is biased against the seat 82 by a compression coil spring 85 which is supported by the spring retainer 86 and by the pressure of the fluid in the pumping chamber 81. Although not clearly shown in the drawings, the spring retainer 86 includes an opening which readily permits fluid to pass into the pumping channel 40.

The discharge valve 39 is identical in construction to the suction valve 40 except that its position is inverted. The discharge valve 39 includes a seat member 89, a valve plate 90, a spring 91, and a retainer 92, which operate identically to their respective members in the suction valve 40. However, the valve 39 allows fluid to pass from the pumping chamber 81 and into the discharge chamber 94, but prevents fluid from passing from the discharge chamber 94 into the pumping chamber 81.

The operation of the valve assembly and each of the valves 39 and 40 can best be understood by considering their operation in conjunction with the movement of the diaphragm 41. When the diaphragm 41 moves upwardly, a partial vacuum is created in the pumping chamber 81 thereby causing fluid to flow from the suction chamber 88, through the valve 40, and into the pumping chamber 81. During the downward movement of the diaphragm 41, fluid is forced from the chamber 81, through the valve 39, and into the discharge chamber 94.

Reference is next made to FIG. 4 which shows an alternate diaphragm arrangement with a spring loaded follower plate. In this embodiment, the follower plate 120, and thus the diaphragm 122, is biased upwardly via the spring or bias member 121 which is supported at one end by a portion of the pumping chamber. This arrangement will operate acceptably in the previously described pump structure providing the springs 121 and 164 combined to exert a pressure greater than atmospheric pressure.

FIG. 5 shows a further alternate diaphragm arrangement for use in a long stroke pump diaphragm of the bellaphram type. In this embodiment, the plunger stem 124 is secured to the follower 125 by the screw 126. The diaphragm 128 is disposed between the castings 22 and 24 and is designed to reciprocate a considerably greater distance than the diaphragm 41 shown in FIGS. 2 and 3. The embodiments in each of FIGS. 4 and 5 also include a shoulder or seat member 129 against which the diaphragm is designed to seat upon upward movement of the piston 130. Similar to the embodiment described in FIGs. 2 and 3, the diaphragms in FIGS. 4 and 5 are designed to seat against the seat member 129 slightly before the end of the upward piston stroke. This allows for the hydraulic fluid cell in the transfer chamber to be replenished with hydraulic fluid which has leaked from the chamber during the downward stroke of the piston 130.

With general reference to FIG. 2 and specific reference to FIG. 3, the operation of the pump 10 may be described as follows: First of all, as the cam shaft 12 and the cam plate 21 are rotated by the motor (not shown), the three pistons 48 are caused to reciprocate. Since the pistons 48 are positioned 120° apart, the strokes of the three pistons will also be 120° apart. Therefore, as one of the pistons 48 reaches the end of its upward stroke, the second one will be two-thirds of the way toward completion of its downward stroke and the third will be one-third toward completion of its upward stroke. This repated and sequenced reciprocation causes the output pressure and volumetric flow rate to be maintained at a relative constant value.

Upon starting up the system, the case 17 is filled with oil to the level indicated on the sight glass 38. The transfer chamber 61 is full of air and the diaphragm 41 is against the diaphragm seat or shoulder portion 77 regardless of the position of the piston 48. Reciprocation of the piston 48 then forces the air in the chamber 61 up through the clearance space between the piston 48 and the cylidner wall 49 until the chamber 61 is evacuated to a point where the valve 62 opens and allows the chamber 61 to fill with oil from the case 17. Shortly, all of the air will be displaced from the chamber 61 and an oil cell is formed. From then on, the diaphragm displacement is equal to the piston displacement less the oil which leaks past the piston 48 on the pressure stroke. The leakage of fluid past the piston 48 occurs during normal downward movement of the piston.

On the return stroke the oil in the chamber 61 is replenished whenever the diaphragm 41 engages the shoulder 77 thereby causing the pressure in the chamber 61 to drop below atmospheric pressure by an amount greater than the pressure required to open the check valve comprising the members 62, 64 and 68. As mentioned previously, the diaphragm is designed to engage the surface 77 slightly before the end of the upward stroke of the piston 48 to insure a replenishment of the oil in the chamber 61. This controlled leakage past the piston 48 keeps the piston lubricated and oil in the chamber 61 cool.

As is evident from FIG. 3, the spring member 75 is disposed between the diaphragm means, namely the stem 70 and the piston 48, and is adapted for movement therewith. As is further evident, deflection of the spring 75 will occur only when there is relative movement between the piston 48 and the stem 70. In such cases, the magnitude of the deflection will be equal to such relative movement. Relative movement between the diaphragm means and the piston 48 can occur in two ways. One is during the downward movement of the piston when a small amount of hydraulic fluid leaks from the transfer chamber 61 between the piston 48 and the sleeve 49. In this situation, the downward movement of the diaphragm means is less than the corresponding downward movement of the piston 48 due to the small amount of fluid which is lost. This results in a small extension of the spring 75. The other is during the upward movement of the piston 48 when the diaphragm 41 engages the shoulder 77. In this situation, the piston 48 moves upwardly a small distance after engagement of the shoulder 77 by the diaphragm. This results in a small compression of the spring 75 and a replenishing of hydraulic fluid in the chamber 61 through the ball check valve 62. It should be noted that the loss of fluid from and/the replenishing of fluid to the chamber 61, as discussed above, and the relatively small deflection of the spring 75, occurs during each normal stroke of the piston 48.

Except for the time that the diaphragm 41 is supported by the shoulder portion 77, the hydraulic pressure in the chamber 62 is always greater than that on the pumping chamber side of the diaphragm by an amount equal to the pressure exerted on the plunger 70 by the spring 75, which in the preferred embodiment is about 15–18 p.s.i. This pressure plus the pressure required to open the check valve comprising the members 62, 64 and 68 is always above atmospheric. Consequently, a full shut off in the suction line causes a cavitation in that line rather than in the chamber 61. This prevents the chamber 61 from ever becoming overfilled with oil, which could cause a hydraulic lock on the pressure stroke.

During the upward movement of the piston 48 and thus the diaphragm 41, the discharge valve 39 is closed and the fluid to be pumped flows from the suction chamber 88 through the suction valve 40 and into the pumping chamber 81. During the downward movement of the piston 48 and the diaphragm 41, the suction valve 39 is closed and the fluid is pumped from the chamber 81, through the valve 40 and into the discharge chamber 94.

The pressure control and unloader valve which is illustrated best in FIGS. 2 and 6 includes a pressure control chamber 94 into which pumping fluid flows from the pumping chamber 81 through the valve 39. The pressure control and unloader valve further includes movable valve assembly disposed between the pressure control chamber 94 and a discharge chamber which is located between the chamber 94 and the pump outlet 18 which assembly includes a first valve means and a fluid reactive surface exposed to the discharge chamber. A second or bypass valve means is disposed between the chamber 94 and the suction chamber 88 of the pump. Referring specifically to FIG. 6, the bypass valve includes a valve means 26 disposed between the pressure control chamber 94 and the suction chamber 88 and a spring cavity 44 housing a spring or bias member 95 urging the valve 26 toward a closed position. The valve means 26 is disposed on one end of an elongated stem member 42 and includes an end 96 having a valve portion 98 adapted for engagement with a seat member 99. As illustrated in FIG. 2, the valve and seat arrangement separate the fluid suction chamber 88 from the chamber 94 when the valve 98 and seat 99 are in a closed position. When the end 96 is forced rearwardly to an open position, the chambers 88 and 94 are in communication with each other. The valve end 96 is designed to slidably engage the interior cylindrical surface of the spring cavity 44 and engage one end of the spring member 95. The spring member 95 is a conventional coil compression spring and is designed to bias the end 96, and thus the valve portion 98, against the seat 99. One end of the cavity 44 includes an internally threaded portion 100 adapted to threadably receive a member 101 which may be advanced along the threaded portion 100 to vary the force exerted by the spring member 95 on the end 96. A suitable packing or sealing 102 is disposed between the outer cylindrical surface of the end 96 and the inner cylindrical surface of the cavity 44 to prevent the fluid in the chamber 88 from passing into the cavity 44. In the preferred embodiment, the pressure control and unloader valve has a generally cylindrical body forming a generally cylindrical bore, in which the valve assembly is movably mounted in a direction toward and away from the pressure control chamber 94 along the longitudinal axis of the bore.

Mounted to the other end of the elongated stem 42 is the movable valve assembly including the first valve means which comprises a movable or floating check valve disposed between the chamber 94 and the discharge chamber.

As best illustrated in FIGS. 6 and 8, this moveable check valve includes a valve seat member 104 which defines one end of the chamber 94 and which is movably mounted on the end of a longitudinal stem 105 which is an extension of the stem 42. The stem 105 has a shoulder portion 106 against which the seat 104 is disposed. Around the peripheral edge of the seat member 104 is a suitable "O" ring 108 or sealing material effective to seal the pressure control chamber 94 from the pump outlet 18 or the discharge chamber. A cylindrical bushing 109 abuts one side of the member 104 to tightly secure the member 104 against the shoulder 106. The bushing 109 is in turn retained at its other end by the lock-nut 110 which is threadedly received by the end of the stem 105.

As best illustrated in FIG. 8, the seat member 104 includes a plurality of openings 111 through which fluid may flow from the pressure control chamber 94 into the discharge chamber and to the pump outlet 18. Adapted to seat against the member 104 is a valve disc 117 which is urged toward the seat member 104 by the spring 114. The disc 117 is composed of a material having resilient properties and is a synthetic which has been recognized by the tradmark "Viton". In the preferred embodiment, this material has a durometer of about 90. The disc 117 is backed by a stainless steel plate member 113. The spring member 114 is retained by a spring retaining member of stem cap 115 which is disposed between the bushing 109 and the lock-nut 110 and is securely held there by the nut 110.

During normal operation fluid passes from chamber 94 through the openings 111, between the valve disc 117 and the seat 114, through the discharge chamber and pump outlet 18 and into the discharge system. When there is no restriction downstream from the outlet 18 of the pump, pumping fluid will continue to flow from the chamber 94 in this manner providing the difference between the pressure in the chamber 94 and the discharge chamber is sufficient to overcome the force of the spring 114. However, if a restriction such as a spray gun, is placed in the system downstream from the outlet 18, the pressure in the discharge chamber pressure control and the chamber 94 will gradually increase until the force exerted by the spring 95 on the end 96 of the bypass valve is overcome at which time the bypass valve 26 will open allowing fluid to flow from the chamber 94, through the bypass valve means 26 and into the suction chamber 88 where it is recycled back through the pumping chamber. However, if there is a sudden shut off in the discharge line (not shown), the result will be such that a pressure wave will be formed in the discharge line and will move from the discharge end 18, through the discharge chamber and toward the floating check valve assembly. When it reaches the check valve assembly the force of the pressure wave acting on the floating check valve will cause the entire valving assembly, including the stem 42 and the floating check valve and valve 26 connected therewith, to move to the right as viewed in FIG. 6 against the shoulder 43. This permits fluid to flow from the chamber 94 into the chamber 88. If the discharge line is gradually closed as described above the pressure in the outlet 18 and the chamber 94 will gradually increase until the pressure is sufficient to overcome the force of the spring 95, thus opening the valve 26. Thus, it can be seen that the surface of the check valve which is exposed to the discharge chamber functions as a fluid reactive surface responsive to a pressure wave formed in the discharge chamber. As previously described, the check valve is operatively connected to the valve 26 such that the valve 26 is opened when the pressure wave acting on such fluid reactive surface is sufficient to overcome the bias means 95.

Referring now to FIg. 6, the operation of the pressure control and unloader valve can be described as follows: During normal operation of the pump, the pump outlet 18 is in communication with an outlet line and an operative device (not shown) which may, for example, by a spray gun. When the spray gun is being operated, fluid flows from the pressure control chamber 94, through the check valve which comprises the elements 114, 113, 117 and 104, into the discharge chamber and out through the pump outlet 18. If there is a restriction in the outlet line which precludes the fluid in the chamber 94 from being removed therefrom at fast as it is being supplied from the pumping chamber, pressure will build in the chamber 94 until it overcome the spring 95, at which time the excess fluid will pass through the valve 26 to the suction chamber 88. Of course, when the pressure in the chamber 94 drops below that sufficient to overcome the spring 95, the valve 26 closes. In this manner, relatively constant fluid pressure is maintained in the chamber 94 at all times during normal operation. If a change in such pressure is desired, the screw member 101 is adjusted accordingly. It should be noted that the force necessary to open the bypass valve 26 is dependent only upon the size of the spring 95 and does not depend upon the pressure differential between the pressure control chamber 94 and the suction chamber 88. Thus, the magnitude of the control pressure is determined by the magnitude of the spring 95.

If the spray gun should be suddenly shut off, a pressure wave formed by this sudden shut-off moves from the spray gun and back along the outlet line toward the pump at the speed of sound in water. When this pressure wave reaches the movable check valve, it causes the entire valving assembly, including the check valve, the stem 42 and the valve 26 to move toward the right as viewed in FIG. 6. As a result of this movement, the valve 26 is caused to move to a wide open position thereby allowing fluid which is in the chamber 94 to freely bypass the valve assembly 26 and return to the suction chamber 88 to be recirculated. Thus, through the use of the moving pressure wave acting upon the movable check valve, a more responsive unloading action is accomplished than that of a conventional unloader valve. As soon as the spray gun is again opened, the valve 26 returns to its normal operating position and normal pressure control is reestablished. It should be noted that the size of the spring 95 resisting movement of the valve assembly must be less than the intensity of the pressure wave formed by a sudden shut-off to cause the valve 26 to be opened in the manner described above.

Although the description of the present invention has been very specific, it is contemplated that the present invention may be embodied in other forms not specifically illustrated or described in the present description. Consequently, the inventor intends that the specific description has been illustrative only and intended only to describe a working embodiment. Consequently, the scope of the present invention should be determined from the appended claims rather than from the description of the preferred embodiment.

I claim:

1. A pressure control and unloader valve for controlling the supply of liquid at a predetermined control pressure, said valve comprising:
    a liquid pressure control chamber;
    a discharge chamber;
    a movable valve assembly disposed within a generally cylindrical bore between said pressure control and discharge chambers, wherein said valve assembly includes
        a first valve means movable therewith allowing liquid to flow from said pressure control chamber to said discharge chamber when the liquid pressure in said pressure control chamber exceeds the liquid pressure in said discharge chamber but preventing the flow of liquid from said discharge chamber to said pressure control chamber,
        a fluid reactive surface exposed to said discharge chamber and responsive to pressure in said discharge chamber, and
        seal means for forming an effective seal between said pressure control and discharge chambers, said seal means being disposed about the periphery of said valve assembly and adapted for sliding engagement with said cylindrical bore during movement of said valve assembly within said bore; and
    a second valve means in communication with said pressure control chamber for controlling the liquid pressure in said pressure control chamber at said control pressure, said second valve means having a closed position preventing the flow of liquid from said pressure control chamber through said second valve means and an open position allowing liquid to flow from said pressure control chamber through said second valve means, said second valve means being disposed such that said second valve means opens with the liquid pressure in said pressure control chamber and said valve assembly being operatively connected with said second valve means such that pressure in said discharge chamber acting against said fluid reactive surface urges said second valve means toward an open position, said second valve means further including bias means for biasing said second valve means toward a closed position, said bias means being operatively associated with said second valve means and with said fluid pressure control chamber such that the magnitude of said control pressure is determined by the magnitude of said bias means.

2. The pressure control and unloader valve of claim 1 wherein said first valve means forms a portion of said fluid reactive surface.

3. The pressure control and unloader valve of claim 1 having means for adjusting said control pressure wherein said means comprises a means for adjusting the magnitude of the force exerted by said bias means on said second valve means.

4. The pressure control and unloader valve of claim 1 wherein said first valve means is a check valve.

5. The pressure control and unloader valve of claim 1 wherein said first valve means includes a second bias means urging said first valve means toward a closed position, said second bias means being only sufficiently large to close said first valve when there is not fluid pressure differential between said pressure control chamber and said discharge chamber.

6. The pressure control and unloader valve of claim 1 in combination with a diaphragm pump having a pumping chamber, a transfer chamber, a diaphragm disposed between said pumping and transfer chambers and a piston assembly adapted for reciprocation.

7. The pressure control and unloader valve of claim 1 having a generally cylindrical valve body wherein said second valve means is disposed near one end thereof and is adapted for movement between an open and closed position along the longitudinal axis of said valve body.

8. The pressure control and unloader valve of claim 7 wherein said valve assembly is movable within said bore in a direction toward and away from said pressure control chamber along the longitudinal axis of said bore.

9. The pressure control and unloader valve of claim 8 wherein said first valve means comprises a disc shaped member having an O-ring about its periphery in engagement with the surface of said bore and a plurality of holes therein and disposed generally perpendicular to the longitudinal axis of said bore.

10. The pressure control and unloader valve of claim 8 wherein said fluid reactive surface is disposed generally perpendicular to the longitudinal axis of said bore.

11. The pressure control and unloader valve of claim 8 having a stop means in the form of a shoulder portion of said bore for limiting the movement of said valve assembly toward said pressure control chamber.

12. The pressure control and unloader valve of claim 8 wherein each of said valve assembly and said second valve means is mounted on an elongated stem member, said stem member being generally coaxial with said bore.

\* \* \* \* \*